J. L. ROUTIN.
APPARATUS FOR REGULATING THE FIRING OF GUNS.
APPLICATION FILED SEPT. 7, 1917.
1,345,702.
Patented July 6, 1920.
2 SHEETS—SHEET 1.
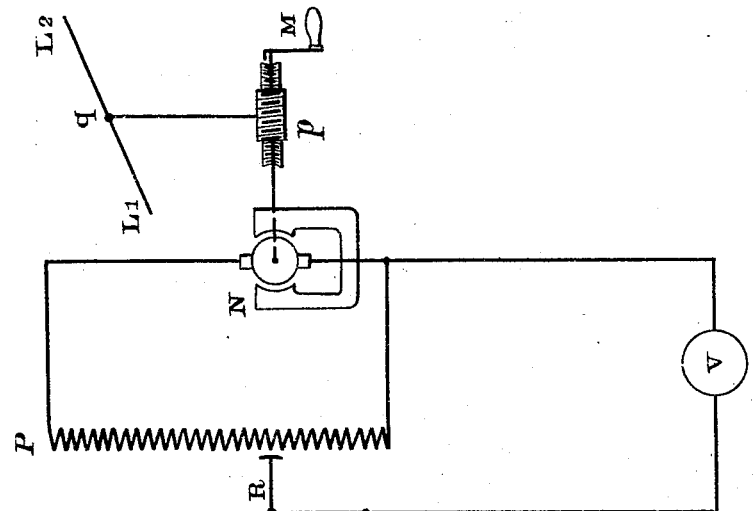
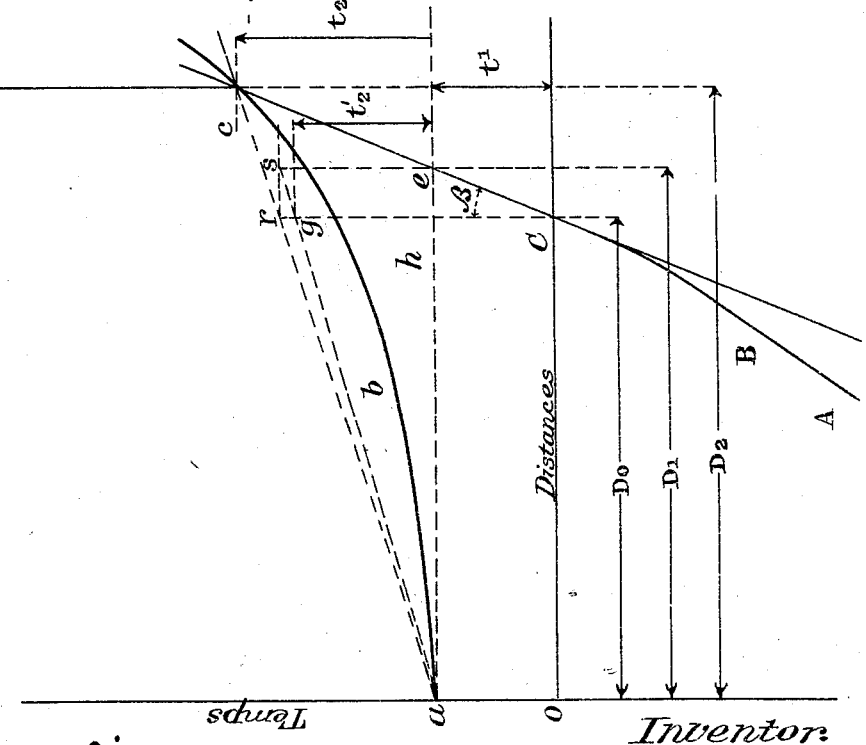
Inventor:
Joseph Louis Routin
By Mauro, Cameron, Lewis & Massie
Attorneys J. L. ROUTIN.
APPARATUS FOR REGULATING THE FIRING OF GUNS.
APPLICATION FILED SEPT. 7, 1917.
1,345,702.
Patented July 6, 1920.
2 SHEETS—SHEET 2.
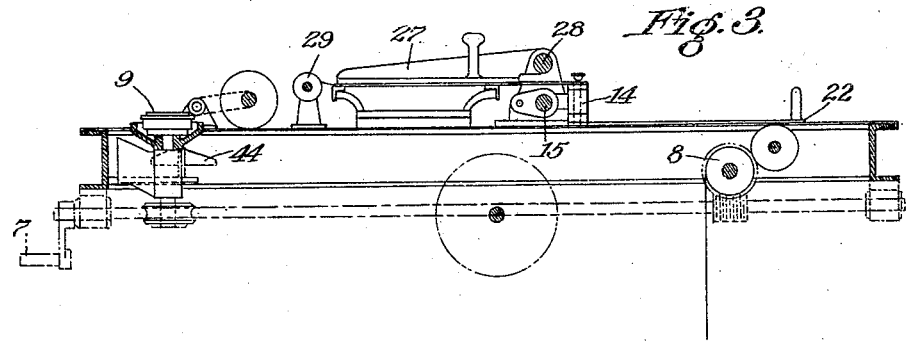
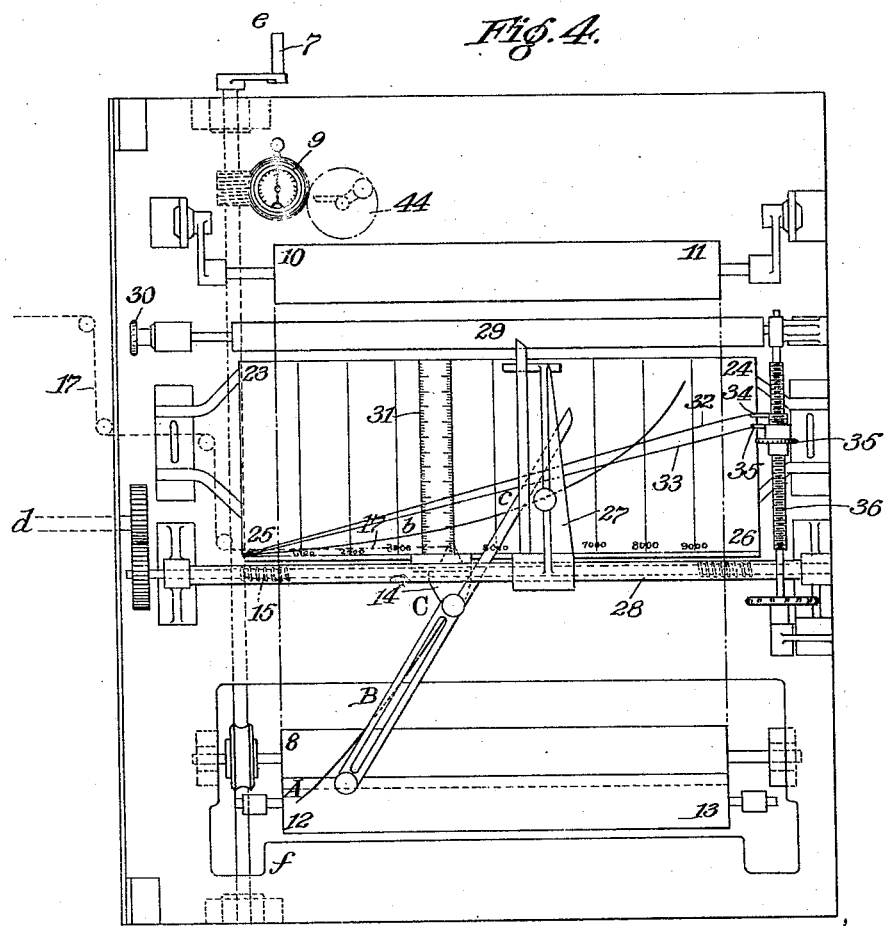

UNITED STATES PATENT OFFICE.

JOSEPH LOUIS ROUTIN, OF PARIS, FRANCE.

APPARATUS FOR REGULATING THE FIRING OF GUNS.

1,345,702.     Specification of Letters Patent.     Patented July 6, 1920.

Application filed September 7, 1917. Serial No. 190,160.

*To all whom it may concern:*

Be it known that I, JOSEPH LOUIS ROUTIN, a citizen of the French Republic, and a resident of 2 Rue Olchanski, Paris, France, have invented a new and useful Improvement in Apparatus for Regulating the Firing of Guns, which invention is fully set forth in the following specification.

The present invention relates to improvements in tachometrical apparatus such as described in my application for U. S. Patent Sr. No. 182,311, filed July 23, 1917, now Patent No. 1,345,697, dated July 6, 1920, and has for its object to provide apparatus for the determination of corrections in lateral aim $\delta$ and in vertical aim $\sigma$ while taking into consideration a corrected time of flight due to the shape of the trajectory.

The correction for lateral aim will be.

$$\delta = t_2 \frac{D^2_0}{D_1 D_2} \left(\frac{d\omega}{dt}\right)_0$$

and the correction for the vertical aim will be $$\sigma = t_2 \frac{D^2_0}{D_1 D_2} \left(\frac{d\alpha}{dt}\right)_0$$

$t_2$ denoting the duration of the projectile's transit, $D_0$ the distance at the time $t=0$ when the readings are made, $D_1$ the distance at the time $t=t$, when the shot is fired, $D_2$ the distance at the time $t=t_1+t_2$ when the projectile reaches the object.

In order that the invention may be more readily understood, reference is had to the accompanying drawings, in which—

Figures 1 and 2 are diagrammatic views explanatory of my invention;

Fig. 3 is a sectional view on the line 3—3 of Fig. 4; and

Fig. 4 is a plan view of a portion of a telechronometrical apparatus embodying the present improvements.

The above approximate formulæ are derived from the following rigorous formulæ for azimuthal and zenithal corrections developed in my application Sr. No. 182,311, filed July 23, 1917:—

$$\sin \delta = \frac{D^1_2 - D^1_1}{V \cos \theta_0} \times \frac{D^2_0}{D_1 \times D_2} \left(\frac{d\omega}{dt}\right)_0$$

$$\sin \sigma = \frac{D^1_2 - D^1_1}{V \cos \theta_0} \times \frac{D^2_0}{D_1 \times D_2} \left(\frac{d\alpha}{dt}\right)_0$$

The quantity $$\frac{D^1_2 - D^1_1}{V \cos \theta_0} = t_2,$$

the time of flight of the projectile. When the angular corrections $\delta$ and $\sigma$ are small, the above formulæ may be written—

$$\delta = t_2 \frac{D^2_0}{D_1 D_2} \left(\frac{d\omega}{dt}\right)_0$$

$$\sigma = t_2 \frac{D^2}{D_1 D_2} \left(\frac{d\alpha}{dt}\right)_0$$

It is to be noted that these formulæ are exact and account for the change in speed of the projectile, due to the position of the airplane.

Within certain limits, the expression $$\frac{D^1_2 - D^1_1}{V \cos \theta_0}$$

is a linear time function and is called the time of flight and would be the correct time of flight in case the projectile would travel with a constant speed, or, in other words, it would be the time of flight if the trajectory were a straight or substantially straight line. This quantity is represented by $t_2$.

Due to the change in speed of the projectile in passing along the trajectory, it is necessary to determine a new or "corrected" time of flight for correcting the directional coördinates of the sighting device. Let this time be called $t^1_2$. It is evident that this quantity depends upon the shape of the trajectory and is only accurately determined when $$\frac{D^1_2 - D^1_1}{V \cos \theta_0}$$

is substantially a lineal time function. From the original formula $$t^1_2 = t_2 \frac{D^2_0}{D_1 D_2}$$

the theoretical method of determining $t^1_2$ from $t_2$ is illustrated in Fig. 1 and its practical application is illustrated in Figs. 3 and 4.

Without being strictly exact, these formulæ nevertheless give very near results. They have, besides, the great advantage of allowing a mechanical determination of the term—

$$t^1_2 = t_2 \frac{D^2_0}{D_1 D_2}$$

which represents the duration of transit by which the angular speeds read at the time $t=0$ must be multiplied in order to obtain the correction to be made in the aim. This result is obtained by means of the following geometrical construction.

Referring to Fig. 1, A, B, C is the graph which gives the distances of the aerial target in functions of time. C is the point on the curve corresponding to the value $t=0$ and $D=D_0$; $D_2$ and extrapolated distance after the time of flight $t^2$; $D_1$ an extrapolated distance after the fictitious time of flight $t^1_2$. B is the angle which the tangent to the curve at C makes with the vertical through C.

From tables of firing may be obtained, for each angle of sight, the time $t$ in which it takes the projectile to reach a distance $d$. For every value of $t$ above a value $t_1$, one may place $d=F(t, \alpha_2)$ and, as in practice the variations of the angle of sight have only a small influence on the values of $d$, one may assume that the values of $d$ are given with a close approximation by the function $d=F(t, \alpha_0)$. Let this curve be traced in $a, b, c$.

Join $a$ to $c$. Draw a vertical through C meeting $a, c$ in $r$. Draw a vertical through $e$ and pass a horizontal line through $r$ meeting the vertical through $e$ in point $s$. Connect $a$ and $s$. Designate by $g$ and $h$ the points of meeting of the vertical through C with $as$ on the one hand and with the horizontal of the point $a$ on the other hand. By construction, $$gh \text{ or } t^1_2 = se \frac{D_o}{D_1}.$$

For $se$ substitute its equivalent $$t_2 \frac{D_o}{D_2}.$$

Then—

$$t^1_2 = t_2 \frac{D^2_o}{D_1 D_2}.$$

Fig. 1 also illustrates a chronotachometer, shown and described in my application Sr. No. 182,981, filed July 26, 1917, whereby, when $t^1_2$ is known, the coefficients of proportionality of the chronotachometer can be regulated without having to read $t^1_2$. The example is given under the assumption that it is required to determine $\delta$.

In Fig. 1, $L_1 L_2$ indicates a sighting device mounted on a vertical shaft Q, P, which is adapted to be turned by a handle M through worm-gear connections. The angular movements of the sighting device are imparted to tachometric means, such as a direct current magneto N, in the circuit of which is a resistance P, Q, and a voltmeter V. It will be noted that the readings of the voltmeter V depend on the speed or voltage developed by magneto N and the position of the contact R along the resistance P, Q. For brevity, let $R_1$ be the resistance of R, Q and $R_2$ the resistance of P, Q; V the difference of potential between the magneto terminals, and G the difference of potential between the point R and the terminal of the magneto, then—

$$\frac{V}{R} = \frac{G}{R_1} \text{ or } G = \frac{VR_1}{R}$$

$$V = \left(\frac{d\omega}{dt}\right)_o$$

for example, and $R_1$ varies as $$gh = t^1_2 \text{ or as } t_2 \frac{D^2_o}{D_1 D_2};$$

hence, $$G = \frac{1}{R} \times t_2 \frac{D^2_o}{D_1 D_2} \left(\frac{d\omega}{dt}\right)_o$$

By selecting proper graduations, the voltmeter may be made to read directly $$t^1_2 \left(\frac{d\omega}{dt}\right)_o$$

or the correction $\delta$.

In operation the resistance P, Q is arranged vertically with its lower end corresponding to the horizontal $t=t$. By placing the movable contact R opposite the point $g$ the desired correction $$\delta = t^1_2 \left(\frac{d\omega}{dt}\right)_o$$

is read direct in the voltmeter $V_1$.

In Figs. 3 and 4 is shown a chronotelemetrical apparatus, such as described and claimed in my U. S. application Serial No. 182,311, provided with my present improvement for determining the fictitious time of flight $t^1_2$. So much of the chronotelemetrical apparatus will here be described as is necessary to show the connection of the present improvement therewith. Referring to Figs. 3 and 4, a drum 8 is driven at a uniform speed by any suitable means such as a shaft operated by a handle 7 and controlled by clockwork 9. Drum 8 advances a sheet of paper 10, 11, 12, 13 under a tracing point mounted on a carriage 14 having below a nut which is mounted on a screw 15. This screw 15 is rotated by aid of range-finding mechanism, not shown, connected through gearing. The position of the carriage on the screw 15 is determined by a cord connection 17 with the range-finder. Under the combined movements of the paper and the tracing point, a curve A, B, C is produced, the horizontal ordinates of which represent ranges of the target at any moment of time $t_o$. Mounted on the carriage 14 is a revoluble pointer 22 adapted to give the direction of the tangent to the curve A, B, C at the point C. Located above the traveling sheet of paper is a stationary plate 23, 24, 25, 26 on which is engraved one or more curves $a, b, c$ which are located above C at a distance $t_1$ and which give the distances of the projectile for different values of the angle of sight. A square or straight edge 27 slides along the rod 28 and permits of directly reading the fuse-setting distance or "distance debouchoir" $D_3$ on the graduated drum 29 of Fig. 4 or cylinder X, Y of Fig. 1 in the vertical which passes through $c$. The graduations placed on the drum are the "distances debouchoir," that is distances in kilometers for setting the fuse-firing device. This distance is a function of the actual distance and of the sight. The drum is therefore provided with different graduations corresponding to different angles of sight.

To properly position the drum, an index-button 30 is provided for turning cylinder 29. This cylinder may also permit the windages to be directly read off.

The duration of the fictitious or corrected time of flight $t^1_2$ is read on a graduated rule 31 mounted on the carriage 14. This rule can be displaced in a manner to bring one or the other of its stops to the vertical through C, thus always permitting point $c$ to be visible.

The graphic construction which permits the fictitious flight $t^1_2$ to be determined is obtained by the aid of two elastic strings 2 and 33, such as two steel wires, fixed on the one hand to the point $a$ and on the other hand to carriages 34 and 35 which can be displaced along a threaded rod 36. As the angle between the two elastic cords 34 and 35 varies only very slightly with the times, and the fact that the carriage 35 is mounted on carriage 34, the manipulation necessary for determining $t^1_2$ is reduced to displacing 34 in a way that 32 passes through $c$. In order to determine times for other angles between the two cords 32 and 33, the square 27 is used which is placed on the vertical line passing though point $e$.

The intervals of firing are regulated by aid of a gong 44 actuated automatically every $t_1$ seconds.

What I claim is:—

1. In combination with telechronographic means for predicting the distance of an aerial target and the time of flight of a projectile, means for proportioning times to distances in accordance with said predicted time and distance of said target and an index element movable with said first-named means for indicating the co-efficient of proportionately $$\frac{t_2(D_o)^2}{D_1 \cdot D_2}$$

by which the angular speed must be multiplied.

2. In apparatus as claimed in claim 1 the combination of electromagnetic means responsive to the angular speed of the target and to an electrical resistance proportional to said factor of proportionately for giving a tachometrical reading of the product $$\frac{t_2(D_o)^2}{D_1 \cdot D_2}\left(\frac{d\omega}{dt}\right)_o \text{ or } \frac{t_2(D_o)^2}{D_1 \cdot D_2}\left(\frac{d\omega}{dt}\right)_o.$$

3. In combination with telechronographic means for predicting the distance of an aerial target and the time of flight of the projectile, graphic means for determining $t^1_2$, the product of the time of flight $t_2$ and the quantity $$\frac{D^2_o}{D_1 D_2},$$

a current generator responsive to the angular speed of the target, a resistance in circuit with said generator, a voltmeter in branched relation to said resistance, and means for varying the branched resistance in proportion to the quantity $t^1_2$.

4. In combination with telechronographic means for predicting the distance of an aerial target and the time of flight of the projectile, tachometric means responsive to the angular speed of the target, means for determining $t^1_2$, the product of the time of flight $t_2$ and the quantity $$\frac{D^2_o}{D_1 D_2},$$

including an index displaceable by the telechronographic means, and means for regulating the coefficient of proportionality of the tachometer in accordance with the quantity $t^1_2$.

5. In apparatus of the character described, the combination of a time controlled movable sheet, a tracing element movable over the same to trace a graph of ranges of a moving target as a time function, a stationary surface provided with a curve adapted to indicate distances to said target in time functions of flight of the projectile, a tangent indicator movable with said element and adapted to intersect said curve to determine a point thereon the coördinates of which give directly the time of flight of the projectile and the predicted distance at the moment the projectile reaches the target, two diverging secant lines anchored at the origin of coördinates of said curve, one of which is adapted to cut said curve in said point, and a scale movable with said tracing element adapted to intersect the companion secant line to give readings of a fictitious time of flight for correcting the aim due to speed variations of the target.

6. In apparatus of the character described, means for tracing a graph of ranges as a time function, a stationary surface provided with a curve giving distances to the target as a function of the time of flight of the projectile, a tangent indicator to the first-named curve movable with said tracing means and adapted to intersect said second curve, a cylinder provided with fuse-setting graduations corresponding to different values of the angle of sight, and a slide adapted to extend a vertical through said intersection for reading the fuse-settings.

In testimony whereof I have signed this specification.

JOSEPH LOUIS ROUTIN. [L. S.]

Witnesses:
 HENRI MONIN,
 JOSEPH GEMENI.